United States Patent [19]

Hauptmann

[11] Patent Number: 5,485,516
[45] Date of Patent: Jan. 16, 1996

[54] LINE TERMINATION FOR A TELEPHONE LINE

[75] Inventor: Jörg Hauptmann, Villach, Austria

[73] Assignee: Siemens Aktiengesellschaft, Munich, Germany

[21] Appl. No.: 86,542

[22] Filed: Jul. 1, 1993

[30] Foreign Application Priority Data

Jul. 1, 1992 [DE] Germany ............... 42 21 567.6

[51] Int. Cl.$^6$ ................................................ H04M 9/08
[52] U.S. Cl. ...................... 379/413; 379/399; 379/387; 379/398; 379/394
[58] Field of Search ..................... 379/413, 394, 379/395, 398, 399, 414, 348, 400, 387

[56] References Cited

U.S. PATENT DOCUMENTS 5,271,059  12/1993  Dielacher et al. ............... 379/399 X

OTHER PUBLICATIONS

IEEE Journal of Solid-State Circuits, vol. 26, No. 7, Jul. 1991, "A Software Programmable CMOS Telephone Circuit"; (Dielacher et al.).

Primary Examiner—James L. Dwyer
Assistant Examiner—Jacques M. Saint-Surin
Attorney, Agent, or Firm—Herbert L. Lerner; Laurence A. Greenberg

[57] ABSTRACT

A line termination of a telephone line includes a regulating transistor connected between conductor terminals of the telephone line. A termination circuit has an amplifier receiving an alternating voltage of the telephone line and a reference voltage, for generating an output correcting variable controlling the regulating transistor. A regulating configuration generates a regulated supply voltage for the termination circuit. A regulating circuit readjusts a conductor voltage of the output correcting variable of the amplifier.

9 Claims, 4 Drawing Sheets

LINE TERMINATION FOR A TELEPHONE LINE

BACKGROUND OF THE INVENTION

FIELD OF THE INVENTION

The invention relates to a line termination for a telephone line, with a regulating configuration for generating a regulated supply voltage for a termination circuit, the termination circuit including an amplifier that receives an alternating voltage of the telephone line and a reference voltage and generates an output correcting variable, which controls a regulating transistor disposed between the conductor terminals of the telephone line.

Such a line termination is known from the publication by F. Dielacher et al, entitled "A Software Programmable CMOS Telephone Circuit", in IEEE Journal of Solid-State Circuits, Vol. 26, No. 7, July 1991 and is described in more detail below in conjunction with FIG. 5. However, in such a device, considerable distortion in the speech signal occurs.

SUMMARY OF THE INVENTION

It is accordingly an object of the invention to provide a line termination for a telephone line, which overcomes the hereinabove-mentioned disadvantages of the heretofore-known devices of this general type and which provides a way of reducing or eliminating the distortion of the prior art devices.

With the foregoing and other objects in view there is provided, in accordance with the invention, a line termination of a telephone line, comprising a regulating transistor connected between conductor terminals of a telephone line; a termination circuit having an amplifier receiving an alternating voltage of the telephone line and a reference voltage and generating an output correcting variable controlling the regulating transistor; a regulating configuration generating a regulated supply voltage for the termination circuit; and a regulating circuit readjusting a conductor voltage according to the output correcting variable of the amplifier.

An advantage of the invention is that the regulating circuit, as a low-frequency regulating loop, enables loop current regulation with high loop amplification, thereby providing rapid compensation for abrupt signal changes in the line current and therefore reducing distortion. With the regulating circuit, direct voltage operating points at the conductor terminals of the telephone line that are on the order of magnitude of the regulated supply voltage Vdd are possible.

In accordance with another feature of the invention, the conductor voltage is proportional to a current through the telephone line.

In accordance with a further feature of the invention, the regulating circuit includes a further amplifier receiving and comparing the output correcting variable and the conductor voltage and generating a correcting variable of the regulating circuit.

In accordance with an added feature of the invention, the output correcting variable of the amplifier of the termination circuit and the correcting variable of the regulating circuit form an input variable for the regulating transistor.

In accordance with an additional feature of the invention, there are provided means for adding the output correcting variable and the correcting variable of the regulating circuit together.

In accordance with yet another feature of the invention, the means for adding the output correcting variable and the correcting variable together include a circuit having two series-connected p-channel transistors with identical gate-to-source voltages.

In accordance with yet a further feature of the invention, there is provided a voltage divider connected upstream of an input of one of the p-channel transistors.

In accordance with yet an added feature of the invention, the regulating circuit has a high loop amplification.

In accordance with a concomitant feature of the invention, the amplifiers are fed back, for generating performance with an integrating component.

Other features which are considered as characteristic for the invention are set forth in the appended claims.

Although the invention is illustrated and described herein as embodied in a line termination for a telephone line, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 5:
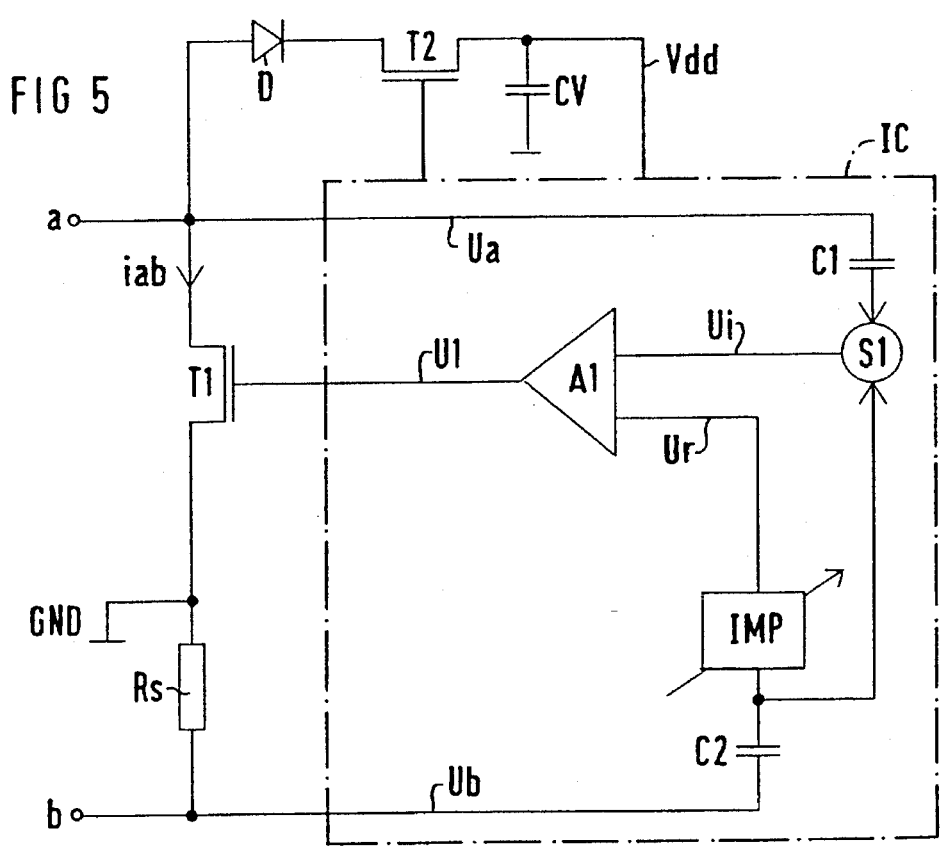
FIG. 5 is a basic block and schematic circuit diagram for a line termination.

Referring now to the figures of the drawing in detail and first, particularly, to FIG. 5 thereof, there is seen a main circuit diagram according to the publication in IEEE Journal of Solid-State Circuits, Vol. 26, No. 7, July 1991, mentioned above.

A current iab flows between conductor terminals a and b of the telephone line. This current is converted into a voltage Ub at a resistor Rs connected on the input side to a reference potential GND. With the aid of a transfer function IMP, a reference voltage Ur is formed from the voltage Ub, which is delivered as a first input to a differential amplifier A1. Since the direct voltage component is decoupled at the line terminal b with the aid of a capacitor C2, the reference voltage Ur is an alternating voltage, which is equivalent to the command value of the line termination impedance. A second input voltage Ui of the differential amplifier A1 is proportional to the alternating voltage at the terminals a and b of the telephone line. To that end, the alternating components of a conductor voltage Ua and the conductor voltage Ub are decoupled with a capacitor C1 and the capacitor C2 and are added together in an adder S1. The amplifier A1 generates an output correcting variable U1 on its output side.

This variable U1 controls a regulating transistor T1 which is disposed between the conductor terminals a and b of the telephone line, in such a way that the voltage Ui is equivalent to the reference voltage Ur. In this way, the telephone line connected to the terminals a and b is terminated with the desired impedance, as defined by the transfer function IMP.

In a version of the line termination with an integrated circuit IC, a regulated supply voltage Vdd for the integrated circuit IC can be generated from the telephone line with the aid of a regulating configuration. The supply voltage Vdd is applied to an electrode of a storage capacitor CV. A diode D located between a transistor T2 and a conductor terminal prevents a current from being able to flow from the capacitor CV into the telephone line if the conductor voltage is less than the supply voltage Vdd. Therefore, the regulating configuration T2, D, CV generates a regulated supply voltage Vdd for the termination circuit IC, T1, Rs.

In the practical embodiment, the amplifier A1 will preferably be constructed as an integrator with a relatively low transit frequency, for the sake of stability. The loop amplification of the impedance regulation shown will then be determined by the frequency-dependent amplification of the amplifier A1 and the fluctuating transconductance of the transistor T1.

Figure 6B:
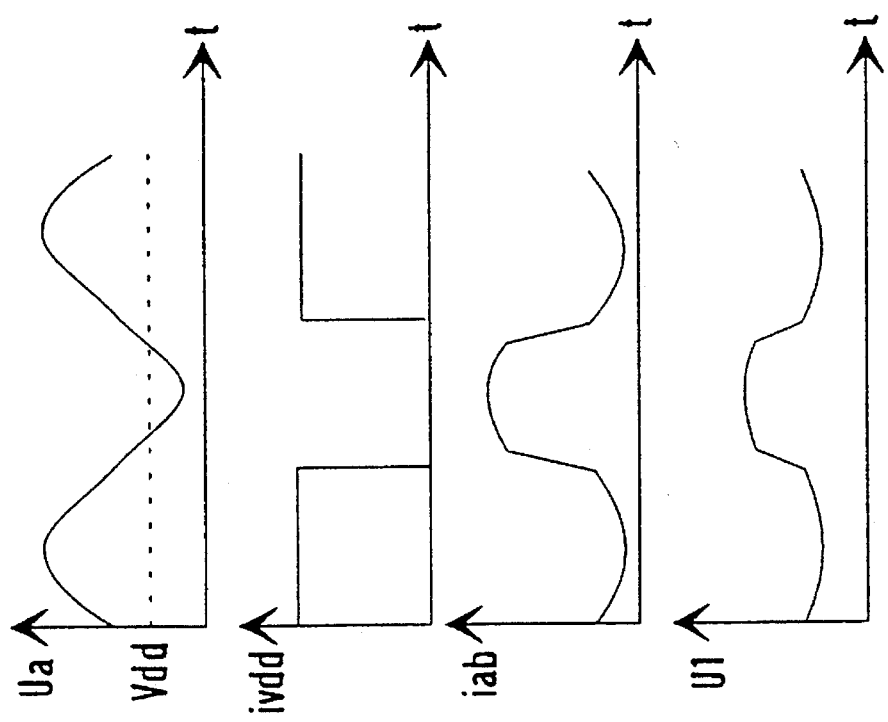
FIG. 6 is a diagram showing signal courses for the line termination of FIG. 5.
Figure 6A:
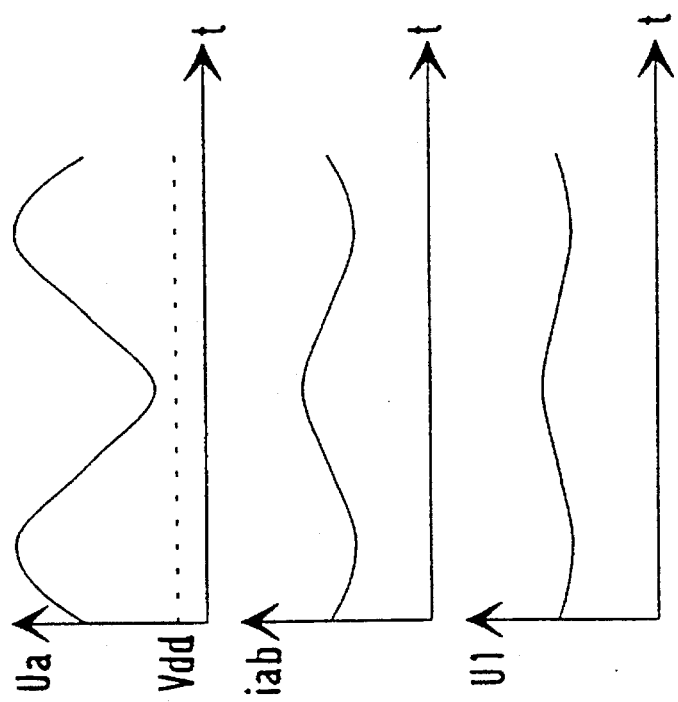

FIG. 6a shows signal courses for the conductor voltage Ua and the supply voltage Vdd in combination with the conductor current iab and the output correcting variable U1 of the amplifier A1. The direct voltage operating point at the conductor terminal a is adequately high in this case, so that the circuit can operate as intended without difficulty. FIG. 6b shows the conditions when there are low direct voltage operating points at the terminal a. At low or negative alternating voltage signals, in other words the speech signals, the voltage Ua can drop below the supply voltage Vdd. As the curve course for a current ivdd shows, under these operating conditions the diode D can enter the blocking state and block the supply current Vdd. This creates an abrupt current overflow in the line current iab, which must be absorbed by the transistor T1. This results in an abrupt rise in the output controlled variable U1. However, since the loop amplification is too low for such high-frequency transient events because of the structure of the amplifier A1, considerable distortion in the speech signal occurs in the region of the transitions of the curve segments.

DESCRIPTION OF THE PREFERRED EMBODIMENTS

Figure 1:
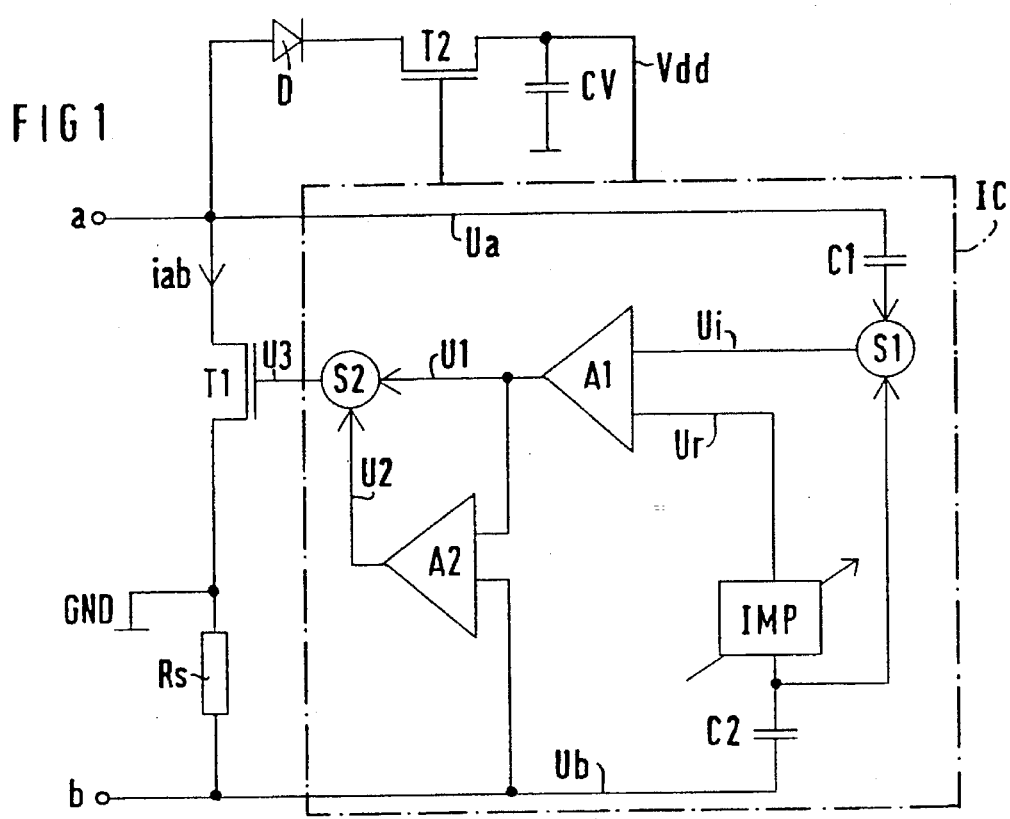
FIG. 1 is a basic block and schematic circuit diagram of a line termination according to the invention.

FIG. 1 is a basic circuit diagram which shows a line termination of a telephone line in accordance with the invention. Elements that are identical to those in the known line termination described in conjunction with FIG. 5 are provided with the same reference numerals in FIG. 1. The configuration of FIG. 1 differs from the configuration of FIG. 5 in that one further amplifier A2 and one adder S2 are additionally provided. One input of the further amplifier A2 receives the output correcting variable U1 of the amplifier A1 and another input thereof receives the conductor voltage Ub of the conductor terminal b. On the output side, the amplifier A2 generates a further correcting variable U2. The output correcting variable U1 and the further correcting variable U2 form inputs of the adder S2, which on the output side generates a correcting variable or input U3 that controls the transistor T1.

The output correcting variable U1 is compared with the voltage Ub at the conductor terminal b of the telephone line, and this voltage is proportional to the loop or line current iab. The adder S2 adds the amplified output voltage U2 to the output correcting variable U1 in order to generate the new correcting variable U3 for the transistor T1. The amplifier A2 has a high amplification, so that the regulating circuit A2, S2, T1, Rs according to the invention overall has a high loop amplification. The high amplification of the amplifier A2 prevents the voltage Ub from deviating from the output correcting variable U1 of the impedance regulation. The compensation for abrupt changes in the loop current iab, which occur in blocking operation of the diode D or in the event of an interruption in the supply current for the capacitor CV and are not caused by the impedance regulation, is performed by the correcting variable U2 and thereby relieves the output correcting variable U1 of the impedance regulating circuit. Therefore, the impedance regulation is then responsible only for simulating the line impedance in accordance with the transfer function IMP or the reference voltage Ur. Adding together the two correcting variables U1 and U2 in the adder S2 then produces the actual correcting variable U3 required for the transistor T1.

With the aid of the regulating circuit according to the invention, as an additional regulating loop with reference to the impedance regulation, a constant loop amplification of the impedance regulating circuit, which is independent of the transconductance of the transistor T1, is also possible. Therefore, improved stability performance or improved control of stability of the line termination can be attained.

Figure 2:
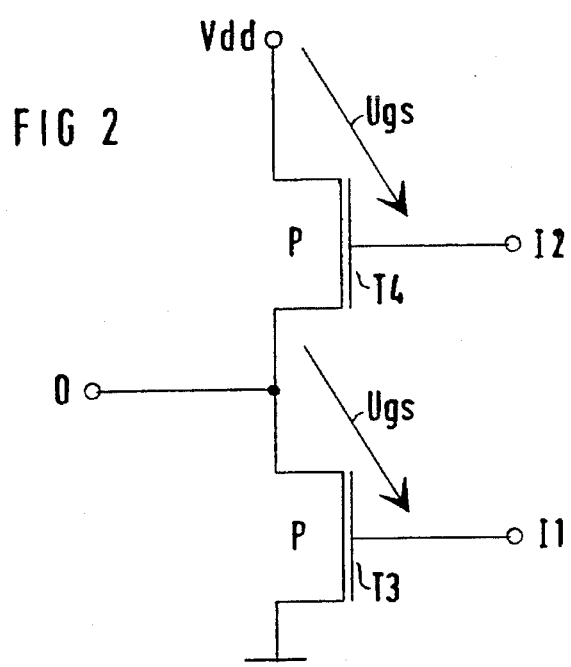
FIG. 2 is a detailed schematic circuit diagram for achieving a simple integrable adder.

FIG. 2 shows a detailed circuit diagram on the layout of the adder S2. Adders of this kind are important elements of regulating circuits. In regulating circuits with high loop amplification, linearity and exact amplification are not an indispensable requirement of adders. This is also true for the adder S2 in FIG. 1. This means that it is not absolutely necessary to undergo major expense in constructing the adder, for instance with an operational amplifier that requires a large amount of surface area. FIG. 2 shows a subtractor as the basic element of the adder, with the subtractor being constructed with two p-channel transistors and being capable of subtracting two alternating signals.

Two p-channel transistors T3 and T4 that are connected in series on the output side and are supplied by the supply voltage, have identical gate-to-source voltages Ugs. The signals to be subtracted are applied to control inputs I1 and I2 of the transistors T3 and T4. A connecting point 0 of the output circuits of the transistors represents the output of the subtractor. The two transistors T3 and T4 have the same magnitude and have the same transverse current flowing through them. Both transistors therefore have the same gate-to-source voltage, which is equivalent to the difference in voltage between the supply voltage Vdd and the input I2.

In the case of alternating-voltage-type control, the output-side alternating signal is in the form of a difference between the alternating signal at the input I1 and the alternating signal at the input I2. The prerequisite for a subtractor constructed in this way is a high-impedance input to the next stage.

In order for the subtractor described in conjunction with FIG. 2 to be operated as an adder, all that is needed is to invert the signal present at the input I2. With the aid of voltage dividers preceding the inputs of the subtractor, a damping factor of the various inputs can be adjusted arbitrarily.

Figure 3:
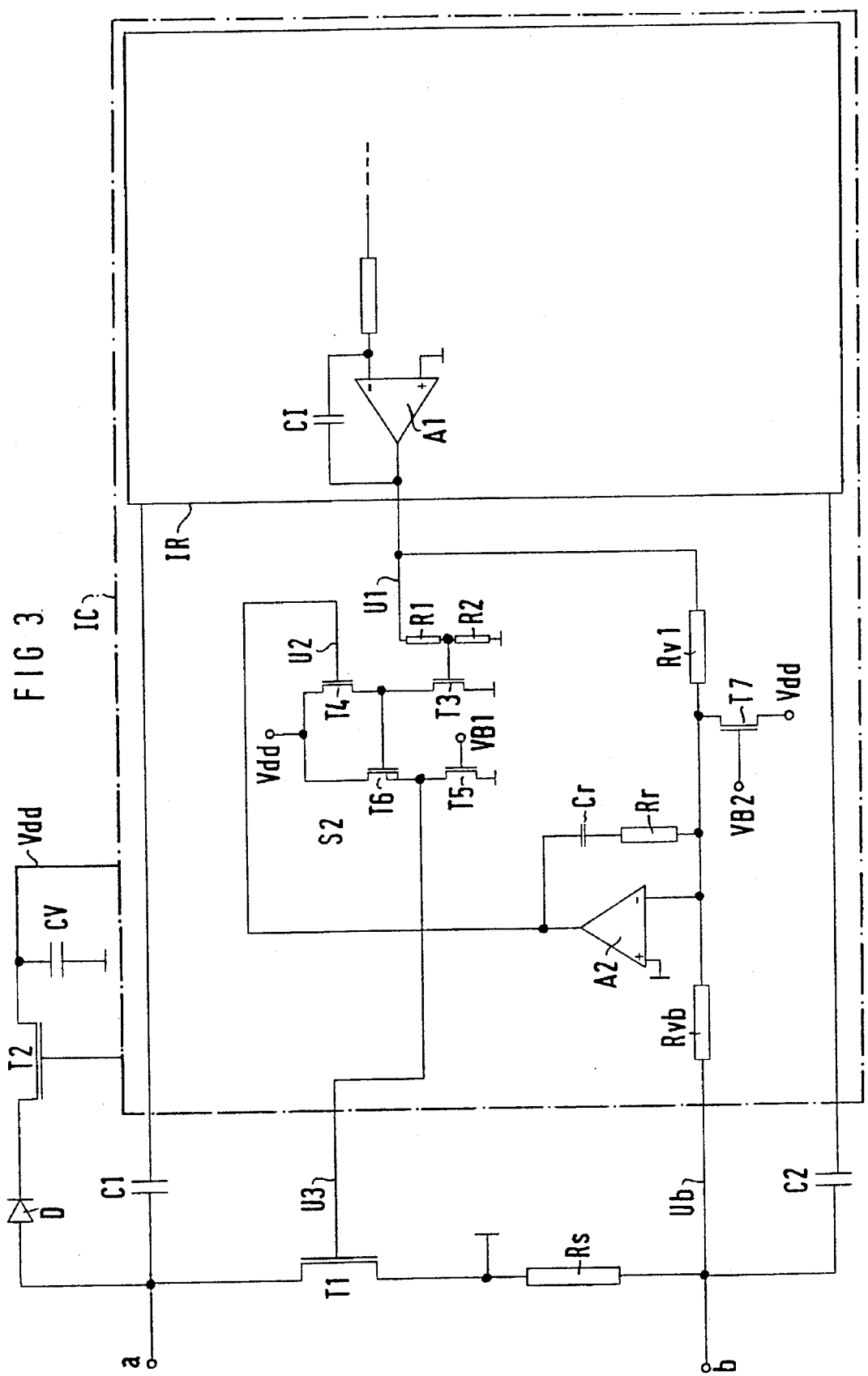
FIG. 3 is a more-detailed schematic circuit diagram for achieving a regulating circuit.

FIG. 3 shows a more-detailed basic circuit diagram of the regulating circuit of the invention. An impedance regulating circuit IR shown as a block is contained in the integrated circuit IC. This impedance regulating circuit includes an operational amplifier A1, which is wired as an integrator with the aid of a feedback capacitor CI and which generates the output correcting variable U1. The further correcting variable U2 is generated with the aid of an operational amplifier A2, which is wired as a proportional-integral controller. To that end, the operational amplifier A2 is equipped in the feedback circuit with a series circuit of a feedback capacitor Cr and a feedback resistor Rr. The output correcting variable U1 and the conductor voltage Ub are applied to the inverting input of the operational amplifier A2 through respective series resistors Rv1 and Rvb. With the aid of a transistor T7, the conductor voltage Ub, which is referred to the reference potential GND, is adjusted to a reference potential Vdd/2 internal to the chip.

The further correcting variable U2 is applied to the input of the transistor T4 of the subtractor which includes the transistors T3 and T4. A portion of the output correcting variable U1 is supplied through a voltage divider R1 and R2 to the input of the transistor T3. The output of the subtractor is decoupled with a pronounced slope from the capacitance of the external transistor T1 by means of a source follower including two n-channel transistors T5 and T6. To that end, the output of the subtractor is connected to the input of the transistor T6, while the input of the transistor T5 is at a reference potential VB1.

Figure 4:
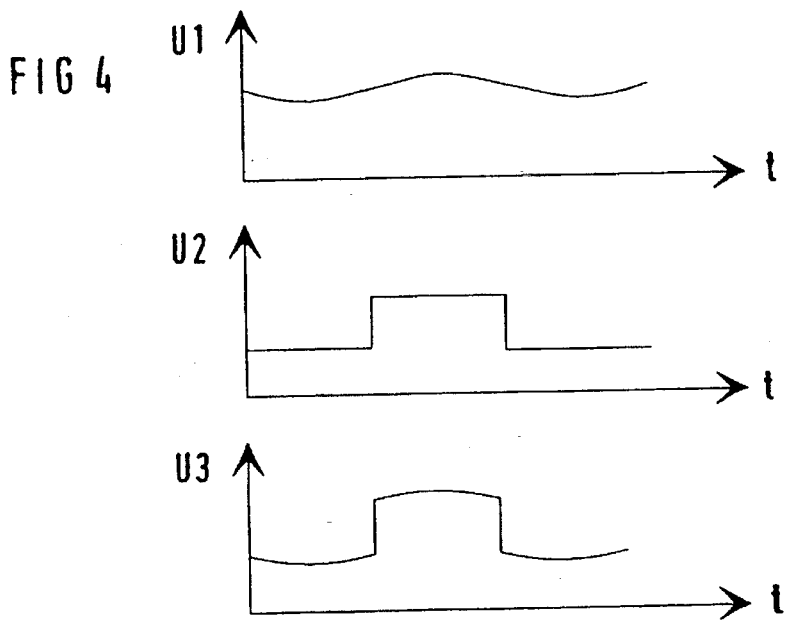
FIG. 4 is a diagram showing signal courses for a line termination according to the invention.

FIG. 4 shows the signal courses of the correcting variables U1, U2 and U3 for a circuit in accordance with FIG. 1 or FIG. 3. The correcting variable U1 can be seen to have a course like that of part a) of FIG. 6. The correcting variable U2 of the regulating circuit according to the invention exhibits a signal jump if there are gaps in the supply current for the storage capacitor CV. The resulting correcting variable U3, which acts as an input variable for the transistor T1, exhibits a signal course that is considerably improved over part b) of FIG. 6. In this way, distortion in the audio signal in the event of gaps in the supply current for the integrated circuit IC can be avoided, or at least substantially reduced.

I claim:

1. A line termination of a telephone line, comprising:
   a regulating transistor connected between conductor terminals of a telephone line;
   a termination circuit having an amplifier receiving an alternating voltage of the telephone line and a reference voltage and generating an output correcting variable controlling said regulating transistor;
   a regulating configuration generating a regulated supply voltage for said termination circuit; and
   a regulating circuit receiving the output correcting variable end a conductor voltage for readjusting the conductor voltage of the output correcting variable of said amplifier.

2. The line termination according to claim 1, wherein the conductor voltage is proportional to a current through the telephone line.

3. A line termination of a telephone line, comprising:
   a regulating transistor connected between conductor terminals of a telephone line;
   a termination circuit having an amplifier receiving an alternating voltage of the telephone line and a reference voltage and generating an output correcting variable controlling said regulating transistor;
   a regulating configuration generating a regulated supply voltage for said termination circuit; and
   a regulating circuit readjusting a conductor voltage according to the output correcting variable of said amplifier; and
   wherein said regulating circuit includes a further amplifier receiving and comparing the output correcting variable and the conductor voltage and generating a correcting variable of said regulating circuit.

4. The line termination according to claim 3, wherein the further correcting variable of said further amplifier of said termination circuit and the output correcting variable of said regulating circuit form an input variable for said regulating transistor.

5. The line termination according to claim 3, including means for adding the output correcting variable and the correcting variable of said regulating circuit together.

6. The line termination according to claim 5, wherein said means for adding the output correcting variable and the correcting variable together include a circuit having two series-connected p-channel transistors with identical gate-to-source voltages.

7. The line termination according to claim 6, including a voltage divider connected upstream of an input of one of said p-channel transistors.

8. The line termination according to claim 1, wherein said regulating circuit has a high loop amplification.

9. The line termination according to claim 3, wherein said amplifiers are fed back, for generating performance with an integrating component.

* * * * *

UNITED STATES PATENT AND TRADEMARK OFFICE
CERTIFICATE OF CORRECTION

PATENT NO. : 5,485,516

DATED : January 16, 1996

INVENTOR(S) : Joerg Hauptmann

It is certified that error appears in the above-identified patent and that said Letters Patent is hereby corrected as shown below:

Column 6, line 2

"end" should read "and".

Signed and Sealed this

Twenty-fifth Day of March, 1997

*Attest:*

BRUCE LEHMAN

*Attesting Officer*   *Commissioner of Patents and Trademarks*